United States Patent
Takahashi et al.

[11] Patent Number: 6,079,553
[45] Date of Patent: Jun. 27, 2000

[54] CARRIER CHAIN

[75] Inventors: Toshio Takahashi, Toyonaka; Katsutoshi Shibayama, Higashiosaka, both of Japan

[73] Assignee: Tsubakimoto Chain Co., Osaka, Japan

[21] Appl. No.: 08/980,907

[22] Filed: Dec. 1, 1997

[30] Foreign Application Priority Data

Jan. 14, 1997 [JP] Japan ................................... 9-004693

[51] Int. Cl.[7] ................................................ B65G 17/06
[52] U.S. Cl. ......................................... 198/852; 198/838
[58] Field of Search .................................. 198/852, 831, 198/838, 845

[56] References Cited

U.S. PATENT DOCUMENTS

| | | | |
|---|---|---|---|
| 4,893,709 | 1/1990 | Schroeder et al. ...................... | 198/852 |
| 5,127,515 | 7/1992 | Damkjaer ............................. | 198/852 X |
| 5,375,697 | 12/1994 | Battati et al. ........................... | 198/852 |
| 5,402,880 | 4/1995 | Murphy .................................... | 198/852 |

FOREIGN PATENT DOCUMENTS 7-11043   3/1993   Japan .

*Primary Examiner*—Jospeh E. Valenza
*Assistant Examiner*—Gene O. Crawford
*Attorney, Agent, or Firm*—Armstrong, Westerman, Hattori, McLeland and Naughton

[57] ABSTRACT

A carrier chain is provided which vibrates less when moving on the curved portion of the guide rail. The carrier chain can carry the article to be carried smoothly and in a more stable state, and can prevent the one-sided wear of the guide rail and the chain units. The carrier chain includes pawls which have an upwardly inclined bottom surface. The pawls are formed on both left and right sides of a base bed portion of chain units which make up the carrier chain. A distance which is relative to a support surface of a guide rail gradually increases from a proximal end side toward an extreme end. When the chain unit moves on a curved portion of the guide rail, and when the chain unit is inclined internally of the curved portion by the tension applied from the adjacent chain units before and behind, the bottom surface of the pawl, which is internal of the curved portion, comes in contact with the support surface in a substantially face-to-face contact state.

2 Claims, 4 Drawing Sheets

CARRIER CHAIN

FIELD OF THE INVENTION

The present invention relates to the construction of a carrier chain which moves along a guide rail having a curved portion within a horizontal plane.

DESCRIPTION OF THE RELATED ART

A carrier chain, capable of carrying articles to be carried along a carrier channel including a curved path within a horizontal plane, is disclosed in Japanese, utility Model Publication No. Hei 7-11043 (hereinafter JP '043).

The carrier chain described in JP '043 is constituted such that a number of chain units, each having a top plate with an upper surface on which to put articles to be carried, are endlessly connected. The chain units are moved while being guided by a guide rail.

As shown in FIG. 10, in each of the chain units A constituting a carrier chain described in JP '043, a bottom surface of a base bed portion C is formed below a top plate B on which an article to be carried is put. The bottom surface of the base bed portion C is supported on a support surface E of a guide rail D and is slidably moved. Pawls F project from both left and right sides of the base bed portion C and are fitted in grooves G on both sides of the guide rail D so as to prevent the moving chain unit A from being levitated.

In the conventional carrier chain disclosed in JP '043, the bottom surfaces of the pawls F are projected from both sides of the base bed portion C of the chain unit A. The bottom surfaces of the pawls F are in the same plane as the bottom surface of the base bed portion C of the chain unit A, when the chain unit A moves from the straight line portion of the guide rail D to the curved portion which is curved within the horizontal plane. The chain unit A, having been supported on the support surface E of the guide rail D in the face-to-face contact state by the bottom surface of the base bed portion B and the bottom surfaces of the pawls F on both sides continuous thereto, is levitated outside of the curved portion by the tension transmitted from the adjacent chain unit. As shown in FIG. 11, the corner portion, at the extreme end of the bottom surface of the pawl F on the side positioned internally of the curved portion, assumes the state of in-line contact with the support surface E of the guide rail D, thus rapidly shifting from the face-to-face contact state to the in-line contact state. Therefore, the chain unit A laterally vibrates, and the article W to be carried, being placed on the top plate B, becomes unstable in its support state. In addition, the support surface D of the guide rail C of the portion in the in-line contact state and the corner portion of the bottom surface of the pawl E of the chain unit A, are subjected to excessive wearing conditions and may possibly wear out early so as to prematurely shorten its service life.

Also, in the case where the chain unit A moves on the straight line portion of the guide rail D, there is a problem in that since the bottom surface of the base bed portion C and the bottom surfaces of the pawls F slidably move on the support surface E of the guide rail D on both sides, an area of the sliding portion is large, a vibration is generated in the chain unit A to make the support state of the article to be carried W unstable, a frictional resistance between the chain unit A and the guide rail C is large, and a power loss increases.

Further, when the chain greatly vibrates up and down due to the chain unit A being shifted from the sprocket on the drive side onto the support surface E of the guide rail D, the pawls F impinge upon the ends of the guide rail D to possibly damage the pawls.

The present invention overcomes the above-described problems of the prior art. It is a primary object of the present invention to provide a carrier chain which lessens vibration when moving on the curved portion of the guide rail, which can smoothly and stably carry the article to be carried, and which can prevent one-sided wear of the guide rail and the chain units.

SUMMARY OF THE INVENTION

For achieving the above-mentioned object, the present invention provides a carrier chain in which a number of chain units are endlessly connected so that the chain units can move on a curved portion within a horizontal plane of a guide rail. The chain units are constructed such that a bottom surface of a base bed portion, which is formed below a top plate and on which is placed an article to be carried, is slidably supported on a support surface of the guide rail. Pawls project from both left and right sides of the base bed portion and are engaged with grooves which are formed so as to oppose each other on both left and right sides of the guide rail to prevent the chain units from being levitated. The carrier chain is characterized in that each of the respective pawls is formed with an upwardly inclined bottom surface at a distance relative to the support surface of the guide rail which gradually increases from the proximal end side toward the extreme end side. When the chain units moves on the curved portion of the guide rail while being slightly inclined, the pawls, which are internal of the curved portion, come into contact with the support surface of the guide rail.

In the carrier chain according to the present invention, the bottom surfaces of the pawls are preferably positioned at a proximal end thereof so as to be slightly above the bottom surface of the base bed portion.

In the carrier chain according to the present invention, the chain units constituting the carrier chain move, while the bottom surface of the base bed portion is supported on the support surface in the face-to-face contact state.

The chain units are sometimes such that at the position entering the curved portion from the straight line portion of the guide rail, the outside thereof is levitated with respect to the center of the curve of the curved portion and the inside thereof is slightly inclined due to the tension acting between the chain units adjacent to each other.

On the other hand, since the bottom surface of the pawl of the chain units is formed to be inclined upwardly from the proximal end side toward the extreme end side, the contact position, with respect to the support surface of the rail, smoothly moves from the bottom surface of the base bed portion to the bottom surface of the pawl, internally of the curved portion, when the chain units are inclined. Therefore, when the chain units enter from the straight line portion to the curved portion of the guide rail, no vibration occurs in the chain.

Further, when the chain units pass through the curved portion of the rail, the bottom surface of the pawl comes into contact with the rail support surface, substantially in the face-to-face contact state. Therefore, the face pressure is not excessively high, and less wear occurs on the support surface of the rail and the pawls.

When the chain moves on the straight line portion of the rail, the bottom surfaces of the pawls on both sides of the base bed portion, are parted from the support surface of the guide rail, and only the bottom surface of the base bed portion of the chain unit comes into contact with the support surface. Therefore, the contact area is small, and the running resistance and vibrations of the chain are less.

Further, at the position where the chain units are shifted from the sprocket on the driven side onto the guide rail and in either the case where the chain greatly vibrates up and down or where the chain is tilted, it is difficult to impinge the end of the pawl of the chain unit on the end of the guide rail, since the bottom surface of the pawl is formed to be inclined upwardly from the proximal end side toward the extreme end side, so that the operation of shifting the chain to the guild rail becomes smooth to prevent the pawls from being broken.

Further, in the case where the bottom surfaces of the pawls are positioned at the proximal end thereof above the bottom surfaces of the base bed portion, even if the bottom surfaces of the base bed portions become worn, it is hard to advance the wear to the bottom surfaces of the pawls and an increase in the passage of time of a contact area between the chain unit and the support surface of the guide rail is suppressed when the chain moves on the straight line portion of the guide rail.

BRIEF DESCRIPTION OF THE DRAWING FIGURES

DETAILED DESCRIPTION OF THE INVENTION

Figure 1:
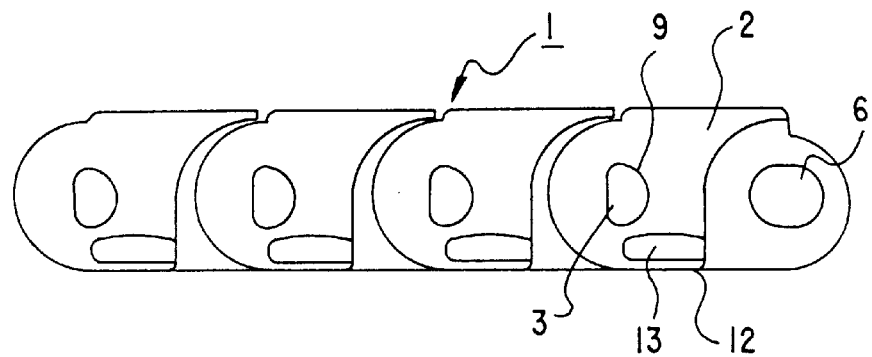
FIG. 1 is a side view showing a part of a carrier chain according to a first embodiment of the present invention.

The embodiments of the present invention will be explained hereinafter with reference to the drawings. FIG. 1 is a side view showing a part of a carrier chain (hereinafter merely referred to as a chain) according to a first embodiment of the present invention. A chain 1 is constituted by connecting a number of chain units 2. The chain units are integrally molded of resin and are connected endlessly by means of connecting pins 3.

Figure 2:
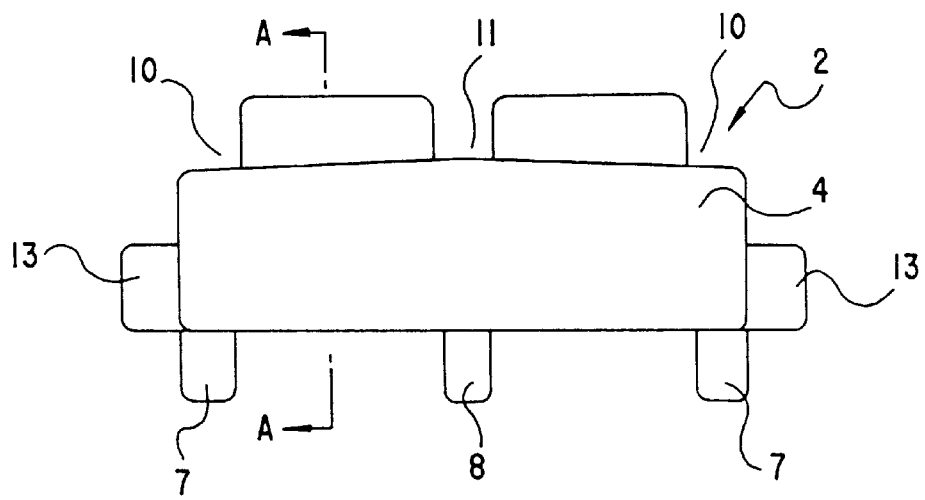
FIG. 2 is a side view showing a part of a chain unit according to a second embodiment of the present invention.
Figure 3:
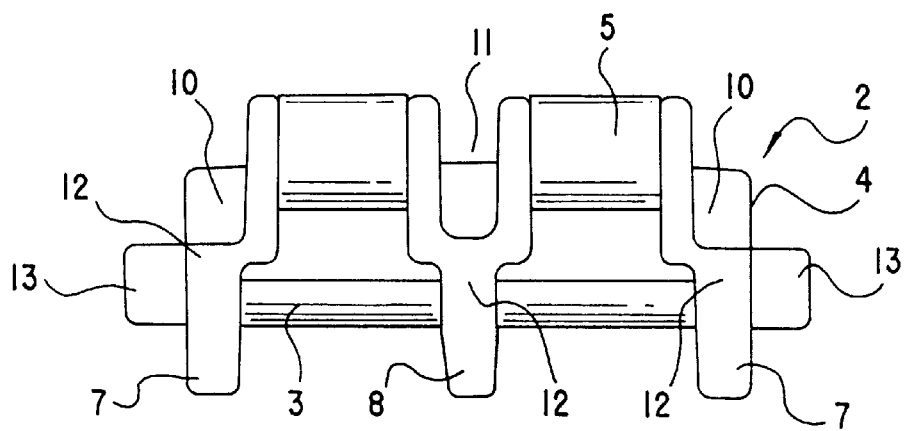
FIG. 3 is a bottom view showing a chain unit according to a third embodiment.
Figure 4:
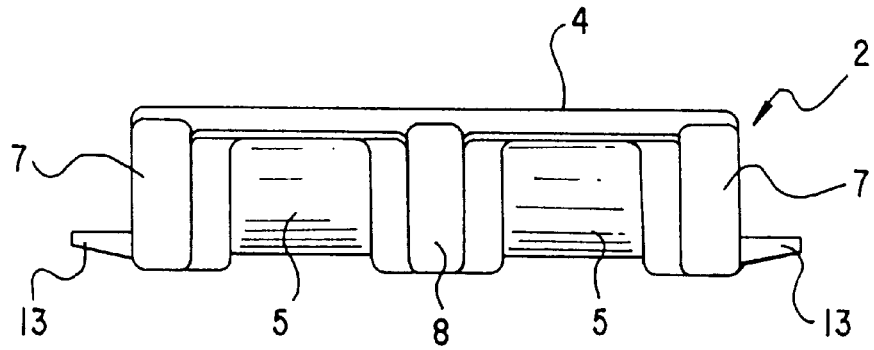
FIG. 4 is a view as viewed from the front in a moving direction of a chain unit according to one embodiment of the present invention.
Figure 5:
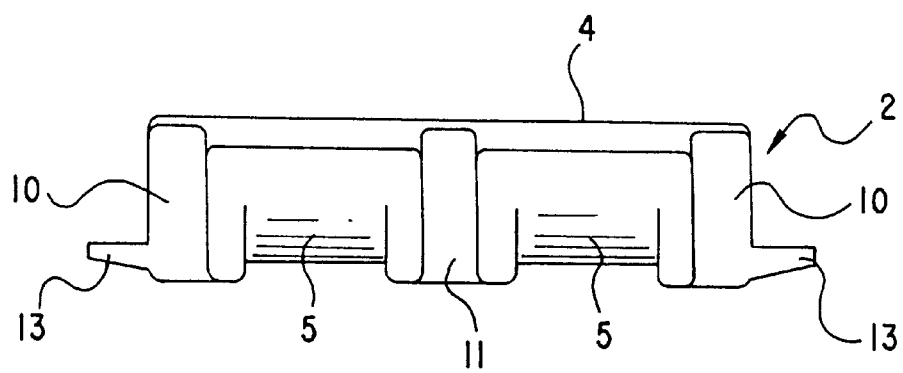

FIG. 2 is a plan view of the chain unit 2 and FIG. 3 is a bottom view thereof. FIGS. 4 and 5 are views, in the case where the chain units 2 are composed as the chain 1, as viewed from front and rear in the moving direction, respectively. A base bed portion 5 is integrally and continuously formed below a top plate 4. Articles to be carried are put on the top plate 4.

Figure 6:
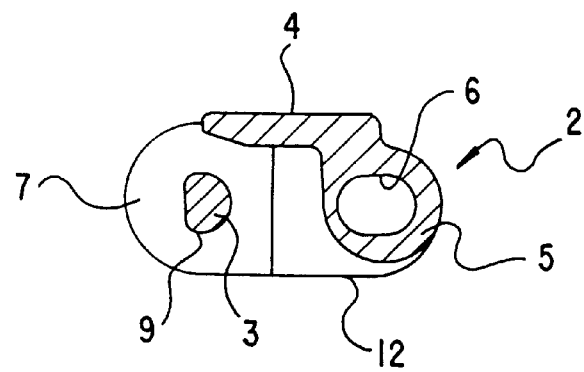
FIG. 6 is a cross-sectional view taken along line A—A of FIG. 2.

FIG. 6 is a cross-sectional view of the chain unit 2, as viewed in the direction of the arrows at a position taken along line A—A, and as shown, an oval-shaped pin hole 6 is formed at the rear of the base bed portion 5. The oval-shaped pin hole 6 extends width-wise of the chain unit 2.

On the other hand, the front portion of the base bed portion 5 is constituted by both left and right ribs 7, 7 and a central rib 8 to form a space which opens frontwardly and downwardly of the top plate 4. The connecting pin 3 extends through the ribs 7 and 8 and is fixed.

That is as shown in FIG. 6, the connecting pin 3 has a cross-sectional shape in which a part of the circumference is shaved off so as to be contained in a plane. The connecting pin 3 is inserted into a pin support hole 9 which has been adapted to the cross-sectional shape of the connecting pin 3. The pin support hole 9 is formed in the ribs 7, 8 and is fixed in a state in which the rotation thereof is restrained with respect to the chain unit 2.

The base bed portion 5, formed with the pin hole 6 therein, has notches 10, 11 at the rear thereof, for receiving the ribs 7, 8 in both left and right portions and in the central portion of the succeeding chain unit 2. FIG. 5 shows a state in which the connecting pin 3 is removed.

The chain units 2, which are adjacent to each other, are bendably connected with the connecting pin 3, which is supported on the succeeding chain unit 2, inserted into the pin hole 6 of the preceding chain unit 2. At this time, since the pin hole 6 is formed into a long oval shape before and behind of the chain unit 2, when the chain 1 is composed as shown in FIG. 1, the chain 1 is easily bent within the horizontal plane.

The bottom surfaces of the ribs 7, 8 are in the same plane, and a bottom surface 12 of the base bed portion 5 is constituted by the bottom surfaces of the ribs 7, 8. The bottom surface 12 of the base bed portion 5 is slidably supported on the support surface of a guide rail (not shown), when a number of chain units 2 are endlessly connected, as shown in FIG. 1, for use as a chain 1.

A pair of pawls 13, 13 project from both left and right sides at lower parts of the base bed portion 5. The pawls 13 are engaged with grooves (not shown) formed opposite to both left and right sides of the guide rail to prevent the chain unit 2 from being levitated above the guide rail.

Figure 7:
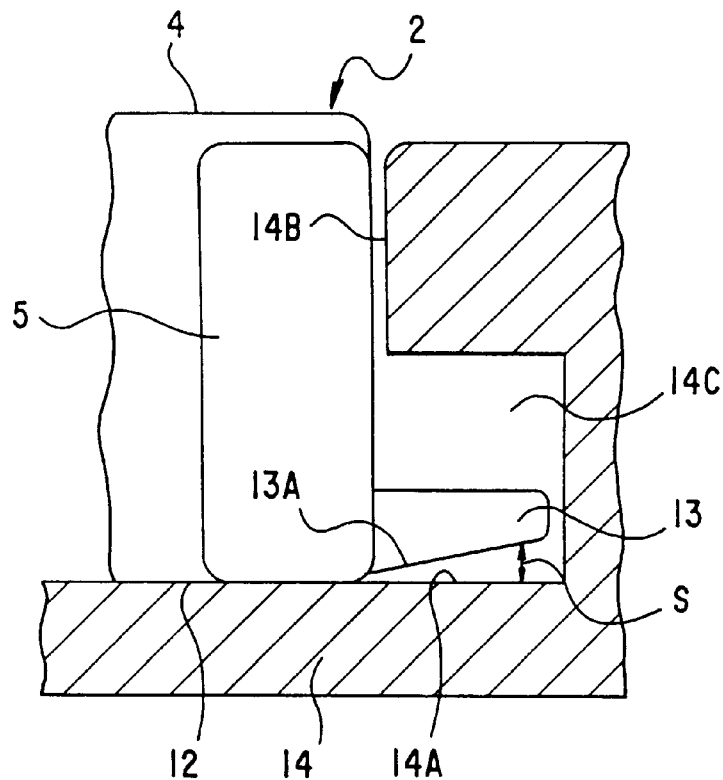
FIG. 7 is a view showing a shape of a pawl as viewed from the rear in a moving direction of a chain unit.

As shown in FIG. 7, the pawls 13 have an upwardly inclined bottom surface 13A so as to gradually increase a distance S relative to a support surface 14A of a guide rail 14 from a proximal end side, continuous to the side of the base bed portion 5, toward the extreme end side. The pawl 13 in the drawing is depicted such that the inclination of the bottom surface 13A is exaggerated for the sake of explanation, but the inclination of the actual pawl 13 is extremely small.

In the present embodiment, the proximal end of the pawl 13 is positioned slightly above the bottom surface 12 of the base bed portion 5. The pawl 13 is moved within a groove 14C formed at the lower part of vertical guide surfaces 14B which are provided on both left and right sides of the support surface 14A. When the chain unit 2 moves on the straight line portion of the guide rail 14, only the bottom surface 12 of the base bed portion 5 comes into contact with and is supported on the support surface 14A, as shown in the drawing. The bottom surfaces 13A of the pawls 13 on both sides are in the state of being away from the support surface 14A. The guide surface 14B is opposed to the side of the base bed portion 5 of the chain unit 2 to control the movement of the chain unit 2 in the lateral direction.

As previously mentioned, the bottom surface 13A of the pawl 13 is inclined upwardly from the proximal end side to the extreme end side, whereby the chain units 2 are composed as the chain 1. In the case where the chain 1 is stretched between the sprocket on the drive side and the sprocket on the driven side (not shown), when the chain unit 2 is shifted from the sprocket side on the driven side to the guide rail 14, the chain unit 2 can be guided smoothly into a groove T, without the front end of the pawl 13 being caught by the end of the guide rail 14.

Figure 8:
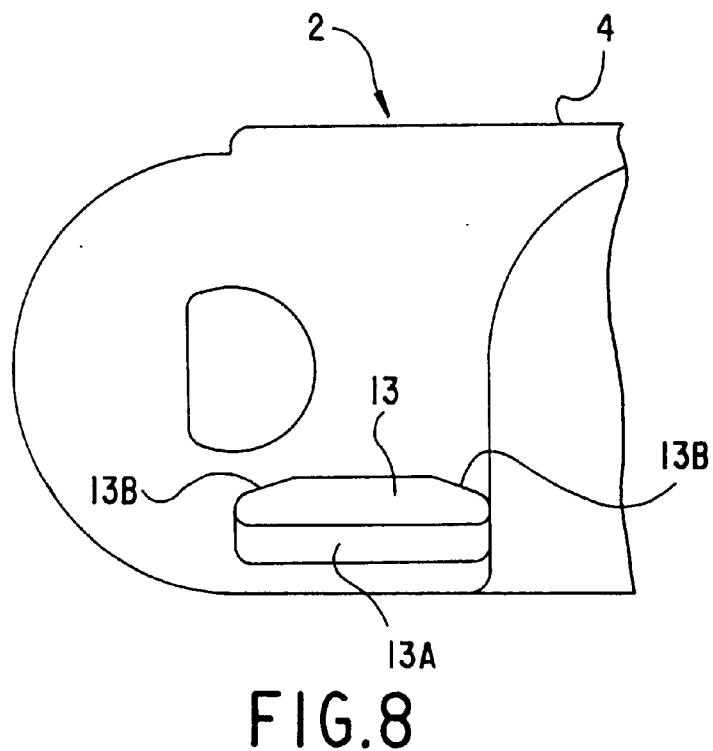
FIG. 8 is a view showing a shape of a pawl as viewed from the side of a chain unit.

As shown in FIG. 8, in order to further smoothly guide the pawl 13 from the end of the guide rail 14 into the groove 14C, guide surfaces 13B are formed in the vicinity of front and rear ends of the upper surface of the pawl 13 and the guide surfaces 13B are inclined downwardly toward the front and rear ends.

Figure 9:
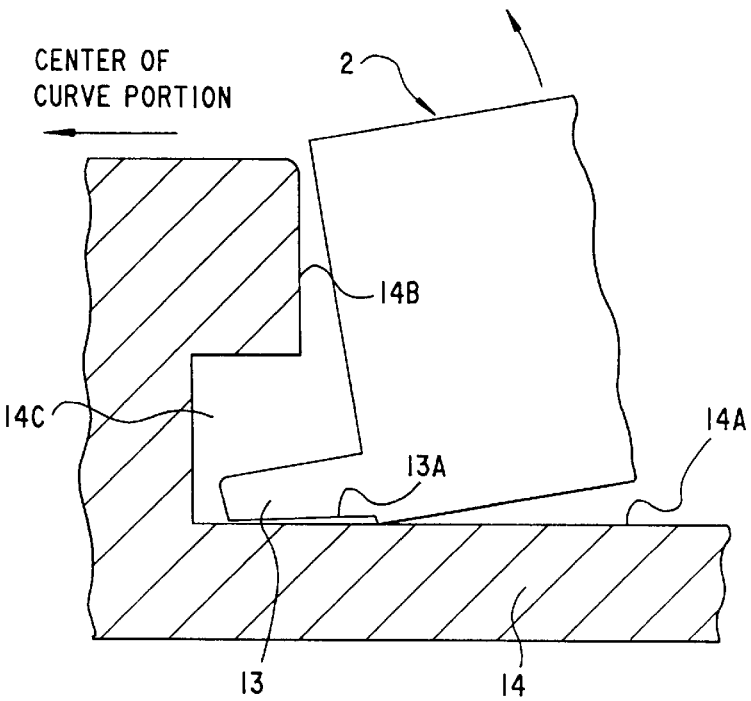
FIG. 9 is a view showing a contact state between a chain unit and a guide rail when a carrier chain of the present invention passes through a curved portion of a guide rail.
Figure 10:
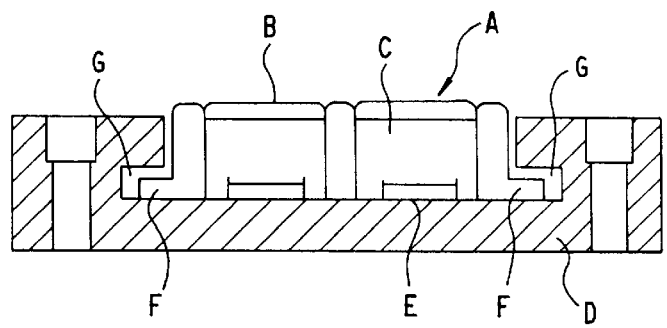
FIG. 10 is a cross-sectional view showing one example of a conventional carrier chain.
Figure 11:
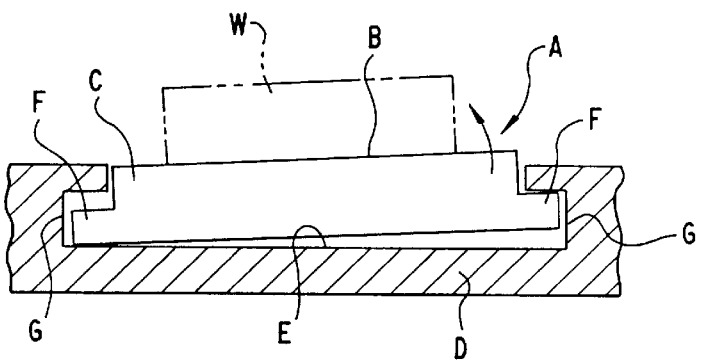
FIG. 11 is a view showing a contact state between a chain unit and a guide rail when a conventional carrier chain passes through a curved portion of a guide rail.

FIG. 9 shows the contact state between the chain unit 2 and the guide rail 14 when passing through the curved portion of the guide rail 14 of the carrier chain according to the present invention. In the chain unit 2 which moves on the curved portion, the outside of the curved portion of the guide rail 14 is levitated by the tension received from the chain units adjacent to each other before and behind thereof, and the inside of the curved portion of the guide rail 14, i.e., the bottom surface 13A of the pawl 13 on the center side of the curved portion, is supported on the support surface 14A of the guide rail 14 in the face-to-face contact state.

While in the drawing, the inclination of the chain unit 2 is shown exaggerated for the sake of explanation, it is to be noted that actually, the bottom surface 13A comes into contact with the support surface 14A with an extremely slight inclination.

While in the aforementioned embodiment, the bottom surface 13A of the pawl 13 is formed into a substantially linear wedge-like inclined surface from the proximal end toward the extreme end, as shown in FIG. 7, it is to be noted that a gentle circular arced surface will suffice. Further, while the proximal end of the pawl 13 is positioned slightly above the bottom surface 12 of the base bed portion 5 in consideration of wear after lapse of time, it is to be noted that the bottom surface 12 of the base bed portion 5 can be formed to be at the same level as that of the bottom surface 13A on the proximal end side of the pawl 13.

Further, while three ribs 7, 8 are shown as formed in front of the base bed portion 5, it is to be noted that the number of ribs is not limited thereto, but at least two or more ribs will suffice. Further, the number of notches, at the rear of the base bed portion 5, for receiving the ribs, may correspond to the number of ribs.

While in the present embodiments, the chain units 2 constituting the chain 1 are integrally molded of resin material, it is to be noted that the chain units 2 can be fabricated of metal material such as aluminum, and the top plate and the base bed portion can be fabricated from separate parts and then combined.

As previously mentioned, according to the carrier chain of the present invention, the pawl of the chain unit is formed with an upwardly inclined bottom surface so that the distance relative to the support surface of the guide rail gradually increases from the proximal end side toward the extreme end side. When the chain unit moves on the curved portion of the guide rail with a slightly inclined support surface, the pawl, which is internal of the curved portion, comes into contact at the bottom surface thereof with the support surface of the guide rail. With this constitution, at a point where the chain unit enters the curved portion from the straight line portion of the guide rail, no rapid vibration occurs in the chain.

As a result, the article to be carried, which has been placed on the top plate, can be transported in a stable manner.

Further, since also located at the curved portion of the guide rail, the bottom surface of the pawl of the chain unit and the support surface of the guide rail come into sliding contact in the face-to-face contact state. Therefore, the one-sided wear of the pawls and the guide rail can be prevented to elongate the service life of the chain and the guide rail.

Further, since in the straight line portion of the guide rail, the bottom surfaces of the pawls projecting from both sides of the base bed portion of the chain units are not in contact with the support surface of the guide rail, the contact area between the chain unit and the support surface of the rail is less, and the chain can be run and driven smoothly with less vibration. As a result, the article to be carried can be transported in a stable manner, and the running resistance of the chain can be reduced to save power necessary for running the chain.

As the position where the chain unit is shifted from the sprocket on the driven side to the guide rail, when the vertical vibrations occur in the chain, it is difficult to impinge the pawl of the chain unit upon the end of the guide rail so that the operation of shifting the chain to the guide rail can be carried out smoothly, and the pawls are prevented from being broken.

Further, in the case where the bottom surface of the pawl is positioned at the proximal end thereof, above the base bed portion, even if the bottom surface of the base bed portion should be worn, it is difficult to advance the wear to the bottom surface of the pawl when the chain moves on the straight line portion of the guide rail, a time-passage increase of a contact area between the chain unit and the support surface of the guide rail can be suppressed to further elongate the service life of the chain.

What is claimed is:

1. A carrier chain assembly for conveying articles, comprising:

a guide rail including a straight line portion and curved portion within a horizontal plane, the guide rail having a horizontal support surface and two opposed guide grooves at both left and right sides of the support surface;

a plurality of chain units endlessly connected, each of said chain units having a top plate on which one or more of the articles are carried, and a base bed portion formed below said top plate, said base bed portion having a bottom surface slidably supported on the support surface of the guide rail; and pawls projecting from both left and right sides of said base bed portion and guidedly received in the grooves of the guide rail to prevent said chain units from being levitated, each of said pawls having a bottom surface inclined upwardly relative to the support surface of the guide rail such that a distance between said bottom surface and the support surface increases gradually from a proximal end toward an extreme end of said pawl, wherein when each of said plurality of chain units, as it is moving on the curved portion of the guide rail, is slightly inclined internally of the curved portion due to a tension applied from the adjacent chain units before and behind, said bottom surface of one of said pawls, which is internal of the curved portion, come in substantially face-to-face contact with the support surface of the guide rail to thereby prevent said chain unit as a whole from levitating.

2. The carrier chain according to claim 1, wherein said bottom surfaces of said pawls are positioned at a proximal end thereof slightly above said bottom surface of said base bed portion.

* * * * *